(12) United States Patent
Hammerum

(10) Patent No.: US 10,030,630 B2
(45) Date of Patent: Jul. 24, 2018

(54) METHOD FOR CONTROLLING A WIND TURBINE DURING SHUTDOWN

(71) Applicant: VESTAS WIND SYSTEMS A/S, Aarhus N (DK)

(72) Inventor: Keld Hammerum, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 286 days.

(21) Appl. No.: 14/782,272

(22) PCT Filed: Apr. 22, 2014

(86) PCT No.: PCT/DK2014/050104
§ 371 (c)(1),
(2) Date: Oct. 2, 2015

(87) PCT Pub. No.: WO2014/173417
PCT Pub. Date: Oct. 30, 2014

(65) Prior Publication Data
US 2016/0032890 A1 Feb. 4, 2016

(30) Foreign Application Priority Data

Apr. 22, 2013 (DK) .............................. 2013 70224
May 7, 2013 (GB) .................................. 1308149.2

(51) Int. Cl.
*F03D 7/02* (2006.01)
(52) U.S. Cl.
CPC ........... *F03D 7/0224* (2013.01); *F03D 7/024* (2013.01); *F03D 7/0264* (2013.01); *Y02E 10/723* (2013.01)
(58) Field of Classification Search
CPC ....... F03D 7/024; F03D 7/0224; F03D 7/0264
See application file for complete search history.

(56) References Cited

U.S. PATENT DOCUMENTS

2009/0148286 A1* 6/2009 Kammer ............... F03D 7/0224
416/31
2010/0196156 A1 8/2010 Svendsen et al.
(Continued)

FOREIGN PATENT DOCUMENTS

EP 1788237 A2 5/2007
EP 2067988 A2 6/2009
(Continued)

OTHER PUBLICATIONS

International Search Report for PCT/DK2014/050104, dated Jul. 11, 2014.
(Continued)

*Primary Examiner* — Igor Kershteyn
*Assistant Examiner* — Brian P Wolcott
(74) *Attorney, Agent, or Firm* — Patterson + Sheridan, LLP

(57) ABSTRACT

A method for controlling a wind turbine during shutdown is disclosed, said wind turbine comprising a rotor carrying at least three wind turbine blades adapted to be pitched individually. A first shutdown strategy is initially selected, and subsequently a second shutdown strategy is selected, the second shutdown strategy ensuring alignment of the pitch angles of the wind turbine blades. The time for switching from the first shutdown strategy to the second shutdown strategy is calculated on the basis of a misalignment of the pitch angles, and in order to align the pitch angles before an estimated point in time where the pitch angles must be aligned, in order to avoid excessive asymmetric loads on the wind turbine blades and/or on the rotor. According to an alternative embodiment, the first shutdown strategy includes moving the wind turbine blades towards a feathered position at identical pitch rates.

16 Claims, 5 Drawing Sheets

(56) References Cited

U.S. PATENT DOCUMENTS

2011/0193343 A1 8/2011 Nakashima et al.
2012/0087792 A1 4/2012 Cousineau et al.

FOREIGN PATENT DOCUMENTS

EP          2290232 A1    3/2011
WO   WO 2013163795 A1 * 11/2013   ............. F03D 17/00

OTHER PUBLICATIONS

Great Briain Search Report for GB1308149.2, dated Nov. 20, 2013.
Danish Search Report for PA 2013 70224, dated Dec. 5, 2013.

* cited by examiner

METHOD FOR CONTROLLING A WIND TURBINE DURING SHUTDOWN

FIELD OF THE INVENTION

The present invention relates to a method for controlling a wind turbine during shutdown. More particularly, the present invention relates to a method for controlling a wind turbine comprising a rotor carrying two or more wind turbine blades adapted to be pitched individually. According to the method of the invention, various loads on the wind turbine during shutdown are minimised. Furthermore, the present invention relates to a control unit adapted to carry out the method and a wind turbine comprising such a control unit.

BACKGROUND OF THE INVENTION

In pitch controlled wind turbines, the pitch of the wind turbine blades is adjusted in response to the wind conditions, and in order to obtain a desired energy production. As the wind turbine blades rotate during operation, the loads on each wind turbine blade changes, e.g. due to wind shear, tower passage, turbulence, etc. This may cause asymmetric load distribution among the wind turbine blades. This is undesirable, since it leads to high loads on the rotor, the drive train, etc. In order to avoid this, an individual pitch control strategy is sometimes used. According to an individual pitch control strategy, the pitch angles of the individual blades are adjusted in order to take conditions at the position of each blade into account.

When a halt command or shutdown command is generated for a pitch controlled wind turbine, e.g. due to an emergency situation, the wind turbine blades are normally moved to a feathered position, i.e. their pitch angles are changed until the wind turbine blades are in a position where they no longer catch the wind. It is often desirable to move the wind turbine blades as quickly as possible to the feathered position.

However, in the case of wind turbines in which the wind turbine blades are pitched individually, the pitch angles of the wind turbine blades are not identical when the halt command or shutdown command is received. On the contrary, the pitch angle of each wind turbine blade has been adjusted in such a manner that it takes the conditions prevailing at the exact position of the blade in question into account. If all the wind turbine blades are simply moved as quickly as possible towards the feathered position when the halt command or shutdown command is received, the mutual differences in the pitch angles will remain as the wind turbine blades continue rotation in the rotor plane, while moving towards the feathered position. Thereby the wind turbine blades are moved away from the positions which dictated the adjustments in the pitch angles, but the adjustments are not altered. This may lead to asymmetric loads on the wind turbine blades which are even worse than would be the case if the pitch angles of the wind turbine blades were simply identical. It may therefore be desirable to provide a control strategy during shutdown of an individually pitched wind turbine, which reduces the asymmetric loads on the wind turbine blades.

Furthermore, during a shutdown as described above, loads are introduced on the tower of the wind turbine. These loads are not necessarily reduced, and may even be increased, if the shutdown is performed in a manner which reduces the asymmetric load on the wind turbine blades. In order to address this, other shutdown strategies could be applied which reduce the loads on the tower. However, such shutdown strategies may increase the asymmetric loads on the wind turbine blades.

Accordingly, it is desirable to provide a control strategy during shutdown of an individually pitched wind turbine, which takes the asymmetric loads on the blades, as well as the loads on the tower into consideration.

EP 2 290 232 discloses a wind turbine pitch angle control device configured to carry out individual pitch control. When a wind turbine halt command is input, the pitch angles of the wind turbine blades are matched, and then the pitch angles are moved to a feathered position. When the wind turbine halt command is input, a representative wind turbine blade may be identified on the basis of the pitch angle from among the plurality of wind turbine blades. The pitch angle of the representative wind turbine blade and the pitch angles of the other wind turbine blades are then matched, and then the pitch angles of the wind turbine blades are moved to the feathered position. The representative wind turbine blade may be the wind turbine blade whose pitch angle is closest to the feathered position.

The control device of EP 2 290 232 reduces the asymmetric loads on the wind turbine blades during shutdown, because the pitch angles are aligned before the wind turbine blades are moved to the feathered position. However, the shutdown process is delayed because the aligning must take place before the movement towards the feathered position is commenced. Furthermore, the loads on the tower are not taken into consideration.

DESCRIPTION OF THE INVENTION

It is an object of embodiments of the invention to provide a method for controlling a wind turbine during shutdown, in which the combined loads on various parts of the wind turbine are reduced as compared to prior art methods.

According to a first aspect the invention provides a method for controlling a wind turbine during shutdown, said wind turbine comprising a rotor carrying at least three wind turbine blades adapted to be pitched individually, the method comprising the steps of:
  receiving a shutdown command for stopping operation of the wind turbine,
  obtaining a measure for a misalignment of the pitch angles of the wind turbine blades,
  calculating a time and/or an azimuth angle span required for aligning the pitch angles of the wind turbine blades, based on said measure for a misalignment,
  estimating a point in time and/or an azimuth angle position where the pitch angles of the wind turbine blades should be aligned,
  moving the wind turbine blades towards a feathered position in accordance with a first shutdown strategy until the time and/or azimuth angle span remaining until the estimated point in time and/or azimuth angle position corresponds to the time and/or azimuth angle span required for aligning the pitch angles of the wind turbine blades, or until one or more predefined criteria is/are fulfilled by the wind turbine, and
  subsequently moving the wind turbine blades towards a feathered position in accordance with a second shutdown strategy, said second shutdown strategy providing alignment of the pitch angles of the wind turbine blades.

In the present context the term 'adapted to be pitched individually' should be interpreted to mean that the pitch angle of each of the wind turbine blades is adjusted individually in order to take the conditions prevailing at the exact position of each wind turbine blade into account, in order to reduce the asymmetric loads on the wind turbine blades, as described above. A wind turbine in which the wind turbine blades are adapted to be pitched individually is sometimes referred to as an individually pitched wind turbine.

According to the method of the invention, a shutdown command is initially received. The shutdown command indicates that operation of the wind turbine is to be stopped. The shutdown command may, e.g., be generated in response to a detected emergency situation, such as failure or malfunction of a component of the wind turbine, a temperature measured in the wind turbine being out of range, or any other suitable situation which requires that operation of the wind turbine is discontinued. Alternatively or additionally, the shutdown command may be generated in response to measured environmental conditions, such as wind speed, humidity, air density, etc. being outside the operating range of the wind turbine. In any event, when a shutdown command is received, it is normally desirable to stop operation of the wind turbine as fast as possible.

When the shutdown command has been received, a measure for a misalignment of the pitch angles of the wind turbine blades is obtained. The measure for misalignment may, e.g., be obtained by obtaining the pitch angles of each of the wind turbine blades and comparing the pitch angles. As an alternative, the misalignment may be measured directly, e.g. by measuring an asymmetric load on the blades or the rotor, or in another suitable manner. The measure for the misalignment of the pitch angles of the wind turbine blades provides information regarding how much difference there is between the pitch angles of the wind turbine blades, and thereby regarding how much of a problem it is that the pitch angles are not aligned.

Based on the measure for a misalignment, a time and/or an azimuth angle span required for aligning the pitch angles of the wind turbine blades is calculated. If the measure for a misalignment indicates that the pitch angles of the wind turbine blades are almost aligned, it must be expected that the pitch angles can be aligned relatively fast once an alignment process is started. On the other hand, if the measure for a misalignment indicates that the pitch angles are far from being aligned, i.e. a high degree of misalignment of the pitch angles, then it must be expected that a longer time and/or a larger azimuth angle span is required for aligning the pitch angles of the wind turbine blades. Accordingly, it is possible to calculate the time and/or the azimuth angle span required for aligning the pitch angles, based on the misalignment.

Next, a point in time and/or an azimuth angle position where the pitch angles of the wind turbine blades should be aligned is estimated. For instance, it may be a requirement that the pitch angles of the wind turbine blades must be aligned within a specific time period following the shutdown command, in order to avoid excessive asymmetric loads on the wind turbine blades and/or the rotor. As an alternative, it may be a requirement that the pitch angles of the wind turbine blades must be aligned before the rotor of the wind turbine has rotated a specified angle from the azimuthal position at the time of receiving the shutdown command. Based on the rotational speed and/or the time derivative of the rotational speed of the rotor at the time of the shutdown command, it is possible to estimate a point in time where the specified angular position of the rotor is reached.

The task is then to perform the shutdown of the wind turbine in such a manner that the pitch angles of the wind turbine blades are aligned at the estimated point in time and/or azimuth angle position, while ensuring that other loads on the wind turbine, e.g. loads on the wind turbine tower, are kept as low as possible.

Therefore the wind turbine blades are initially moved towards a feathered position in accordance with a first shutdown strategy. In the present context the term 'moving the wind turbine blades' should be interpreted to mean that the pitch angles of the wind turbine blades are changed towards a pitch angle representing a feathered position.

The wind turbine blades are moved in accordance with the first shutdown strategy until the time and/or azimuth angle span remaining until the estimated point in time and/or azimuth angle position corresponds to the time and/or azimuth angle span required for aligning the pitch angles of the wind turbine, or until one or more predefined criteria is/are fulfilled by the wind turbine. Preferably, the remaining time and/or azimuth angle span is equal to the required time and/or azimuth angle span. Thus, the first shutdown strategy is applied until there is just enough time and/or azimuth angle span for aligning the pitch angles of the wind turbine blades within the specified time period and/or azimuth angle position. Or the first shutdown strategy is applied until one or more specified criteria is/are fulfilled, e.g. that the pitch angles of the wind turbine blades have reached a level where loads on the wind turbine, other than asymmetric loads arising from the misalignment of the pitch angles, have been reduced below a specified level, or that the rotor speed has reached a predefined, low threshold value. The one or more predefined criteria may, thus, be or include one or more criteria to be fulfilled by the pitch angles of the wind turbine blades.

The first shutdown strategy may, e.g., be a shutdown strategy which ensures that specific loads, such as loads on the wind turbine tower, are kept as low as possible during the shutdown of the wind turbine.

Subsequently, the wind turbine blades are moved towards a feathered position in accordance with a second shutdown strategy. The second shutdown strategy provides alignment of the pitch angles of the wind turbine blades.

Thus, according to the method of the first aspect of the invention, following a shutdown command, the wind turbine blades are first moved towards the feathered position in such a manner that other factors than asymmetric loads on the wind turbine blades and/or the rotor are taken into account, e.g. other loads, such as loads on the tower. Next, the wind turbine blades are aligned, while continuing to move the wind turbine blades towards the feathered position. This is done in such a manner that the wind turbine blades are aligned 'just in time', i.e. it is ensured that the wind turbine blades are aligned at the latest point in time and/or azimuth angle position where the wind turbine blades must be aligned in order to avoid excessive asymmetric loads on the wind turbine blades and/or the rotor. Accordingly, the wind turbine is shut down in a manner which ensures that the wind turbine blades are aligned in time, while ensuring that other loads on the wind turbine are minimised.

The first shutdown strategy may comprise initially moving the wind turbine blades at an initial pitch rate, $k_1$, and subsequently moving the wind turbine blades at a final pitch rate, $k_2$, where $k_1 > k_2$. According to this embodiment, the wind turbine blades are first moved at a high speed, and subsequently at a lower speed. The switch from the high speed, or pitch rate, to the low speed, or pitch rate, is performed at a suitable point in time, e.g. when the pitch angles of the wind turbine blades have reached a specified level, or when the loads acting on specific parts of the wind turbine have been reduced below a certain level.

A shutdown strategy as described above, i.e. where the wind turbine blades are initially moved at a high speed and subsequently at a lower speed, ensures that the loads acting on the tower of the wind turbine are minimised for the following reasons. The high pitch rate, which is initially applied, is applied in order to get control of the rotor speed as fast as possible. Once the rotor speed is stabilized, the pitch rate is reduced to the low pitch rate in order to gently pitch out until the feathered position is reached. Thereby pitching into the negative thrust region is avoided, and this ensures that excessive pulling of the rotor is avoided. Such pulling will often be done in phase with forwards tower-top motion, thereby creating excessive loads on the tower, and it is therefore desirable to avoid. Thus, according to this embodiment, the wind turbine blades are initially moved towards the feathered position in such a manner that the loads on the tower of the wind turbine are minimised, and subsequently in such a manner that the pitch angles of the wind turbine blades are aligned, thereby reducing the asymmetric loads on the wind turbine blades and/or on the rotor of the wind turbine.

The method may further comprise the step of monitoring an acceleration of the rotor of the wind turbine during the step of moving the wind turbine blades towards a feathered position in accordance with the first shutdown strategy, and the pitch rate of the wind turbine blades may be switched from the initial pitch rate, $k_1$, to the final pitch rate, $k_2$, on the basis of the monitored acceleration of the rotor. According to this embodiment, the switch from the high pitch rate to the lower pitch rate is performed when the acceleration of the rotor reaches a specified level or threshold value.

According to one embodiment, the pitch rate of the wind turbine blades may be switched from the initial pitch rate, $k_1$, to the final pitch rate, $k_2$, when the acceleration of the rotor is zero. According to this embodiment, the switch is performed when the rotational speed of the rotor no longer changes. As an alternative, the switch may be performed when the acceleration of the rotor has reached a non-zero, preferably low, threshold value.

Alternatively or additionally, other criteria may be used for determining when to switch from the initial pitch rate, $k_1$, to the final pitch rate, $k_2$, e.g. the rotor speed reaching a specified level or threshold value, specific loads acting on one or more parts of the wind turbine reaching a specified level or threshold value, etc.

The second shutdown strategy may comprise:
comparing pitch angles of the wind turbine blades,
individually selecting a pitch rate for each wind turbine blade, based on the comparing step, and
moving each of the wind turbine blades towards a feathered position at its selected pitch rate.

The step of comparing the pitch angles of the wind turbine blades may comprise obtaining absolute values of the pitch angle of each wind turbine blade, and subsequently comparing the obtained absolute values of the pitch angles. As an alternative, relative values for the pitch angles may be obtained, e.g. with respect to a reference value or with respect to the pitch angles of the other wind turbine blades. As another alternative, the result of the comparison may simply be, or be derived from, the previously obtained measure for a misalignment of the pitch angles of the wind turbine blades. In any event, the comparing step reveals how aligned or misaligned the pitch angles of the wind turbine blades are, which of the wind turbine blades has a pitch angle closest to the feathered position, which of the wind turbine blades has a pitch angle furthest away from the feathered position, and how the pitch angle(s) of the remaining wind turbine blade(s) is/are distributed between these two extremes.

Based on the comparing step, a pitch rate for each wind turbine blade is individually selected. Preferably, the pitch rates may be selected in such a manner that the pitch angles of the wind turbine blades are aligned as fast as possible, while moving all of the wind turbine blades towards the feathered position. The pitch rate for each wind turbine blade may be selected among two or more predefined, discrete pitch rate values. As an alternative, the pitch rates may be selected completely individually from a continuous range of pitch rates. The step of comparing pitch angles of the wind turbine blades may comprise identifying a first wind turbine blade, a second wind turbine blade and a third wind turbine blade, wherein the first wind turbine blade is the wind turbine blade having a pitch angle which is furthest away from the feathered position, the third wind turbine blade is the wind turbine blade having a pitch angle which is closest to the feathered position, and the second wind turbine blade has an intermediate pitch angle.

The step of comparing pitch angles of the wind turbine blades may further comprise comparing the pitch angle, $\theta_2$, of the second wind turbine blade with an average of the pitch angle, $\theta_1$, of the first wind turbine blade and the pitch angle, $\theta_3$, of the third wind turbine blade. According to this embodiment, the comparing step includes determining whether the pitch angle of the second wind turbine blade is closest to the pitch angle of the wind turbine blade having the pitch angle which is closest to the feathered position, or whether it is closest to the pitch angle of the wind turbine blade having a pitch angle which is furthest away from the feathered position.

The step of individually selecting a pitch rate for each wind turbine blade may then comprise:
selecting a high pitch rate, $k_{high}$, for the first wind turbine blade,
selecting a low pitch rate, $k_{low}$, for the third wind turbine blade,
selecting the low pitch rate, $k_{low}$, for the second wind turbine blade, in the case that $\theta_2$ is larger than the average of $\theta_1$ and $\theta_3$, and
selecting the high pitch rate, $k_{high}$, for the second wind turbine blade, in the case that $\theta_2$ is smaller than or equal to the average of $\theta_1$ and $\theta_3$.

According to this embodiment, the pitch rate for each wind turbine blade is selected as one of two discrete pitch rate values, i.e. $k_{high}$ and $k_{low}$. The high pitch rate is always selected for the wind turbine blade having a pitch angle which is furthest away from the feathered position, i.e. for the first wind turbine blade, and the low pitch rate is always selected for the wind turbine blade having a pitch angle which is closest to the feathered position, i.e. for the third wind turbine blade. Thereby the pitch angle of the wind turbine blade having a pitch angle which is furthest away from the feathered position approaches the pitch angle of the wind turbine blade having a pitch angle which is closest to the feathered position, and accordingly the misalignment of the pitch angles is reduced.

In the case that the pitch angle, $\theta_2$, of the second wind turbine blade is larger than the average of the pitch angles of the first and the third wind turbine blades, i.e. if $\theta_2 > (\theta_1 + \theta_3)/2$, then the pitch angle, $\theta_2$, of the second wind turbine blade is closer to $\theta_3$ than to $\theta_1$, i.e. it is closest to the pitch angle of the wind turbine blade having a pitch angle which is closest to the feathered position. Therefore, in order to reduce the misalignment of the wind turbine blades as much as possible and as fast as possible, the low pitch rate, $k_{low}$, is selected for the second wind turbine blade in this case. Thereby the pitch angle of the first wind turbine blade is allowed to 'catch up' with the pitch angle of the third wind turbine blade, as well as with the pitch angle of the second wind turbine blade.

On the other hand, in the case that the pitch angle, $\theta_2$, of the second wind turbine blade is smaller than or equal to the average of the pitch angles of the first and the third wind turbine blades, i.e. if $\theta_2 \leq (\theta_1+\theta_3)/2$, then the pitch angle, $\theta_2$, of the second wind turbine blade is closer to $\theta_1$ than to $\theta_3$, i.e. it is closest to the pitch angle of the wind turbine blade having a pitch angle which is furthest away from the feathered position. Therefore, in order to reduce the misalignment of the wind turbine blades as much as possible and as fast as possible, the high pitch rate, $k_{high}$, is selected for the second wind turbine blade in this case. Thereby the pitch angle of the first wind turbine blade as well as the pitch angle of the second wind turbine blade is allowed to 'catch up' with the pitch angle of the third wind turbine blade.

It should be noted that in the present context it is assumed that the pitch angle of a wind turbine blade is increased when the pitch angle is changed from an operating position to a feathered position. Thus, the wind turbine blade having the pitch angle which is closest to the feathered position has the largest pitch angle, and the wind turbine blade having the pitch angle which is furthest away from the feathered position has the smallest pitch angle.

In the case that the first shutdown strategy comprises initially moving the wind turbine blades at an initial pitch rate, $k_1$, and subsequently moving the wind turbine blades at a final pitch rate, $k_2$, where $k_1 > k_2$, as described above, it could be envisaged that $k_{low} = k_2$ and/or $k_{high} = k_1$. In this case only two discrete pitch rates may be used during the entire shutdown process. However, it could alternatively be envisaged that the pitch rates applied during the first shutdown strategy differ from the pitch rates applied during the second shutdown strategy.

As an alternative, the step of individually selecting a pitch rate for each wind turbine blade may comprise, for each wind turbine blade, selecting a pitch rate among two or more predefined discrete pitch rate values. According to this embodiment, the pitch rates may be selected among two discrete pitch rate values, e.g. as described above. Alternatively, the pitch rates may be selected among three discrete pitch rate values, such as a low, a medium and a high pitch rate. As another alternative, four or more discrete pitch rate values may be available, and the pitch rates for each wind turbine blade may be selected among the available pitch rates, e.g. in such a manner that alignment of the pitch angles of the wind turbine blades is obtained in the most appropriate manner.

As another alternative, the step of individually selecting a pitch rate for each wind turbine blade may comprise, for each wind turbine blade, selecting a pitch rate from a continuous range of pitch rates. According to this embodiment, the pitch rates may be selected to exactly match specific requirements to the shutdown process, in particular with regard to the alignment of the pitch angles of the wind turbine blades.

For instance, the step of individually selecting a pitch rate for each wind turbine blade may comprise selecting pitch rates which cause the wind turbine blades to reach an aligned position substantially simultaneously. According to this embodiment, all of the wind turbine blades are gradually aligned to each other, i.e. a situation will not arise where the pitch angles of two of the wind turbine blades are aligned, while pitch angle(s) the remaining wind turbine blade(s) is/are not aligned. This reduces the asymmetry of the pitch angles during the alignment process.

The step of obtaining a measure for a misalignment of the pitch angles of the wind turbine blades may comprise determining the pitch angles of the wind turbine blades and comparing the determined pitch angles to each other. The pitch angles may, in this case, be determined by measuring the pitch angles. Alternatively, the pitch angles may be inherently known by the system, e.g. because the pitch angles are calculated by a controller, and each wind turbine blade is then moved to the calculated pitch angle position.

The step of obtaining a measure for a misalignment of the pitch angles of the wind turbine blades may further comprise determining a first pitch angle, $\theta_1$, being the pitch angle which is furthest away from the feathered position, and a third pitch angle, $\theta_3$, being the pitch angle which is closest to the feathered position, and the step of calculating a time and/or an azimuth angle span comprises calculating a time, $t_{PA}$, required for aligning the pitch angles of the wind turbine blades as:

$$t_{PA} = (\theta_3 - \theta_1)/(k_{high} - k_{low}),$$

where $k_{high}$ is a highest available pitch rate and $k_{low}$ is a lowest available pitch rate.

$\theta_3 - \theta_1$ provides a measure for how far the largest pitch angle and the smallest pitch angle are from each other, i.e. it provides a measure for the level of misalignment. Furthermore, it indicates how much the pitch angle being furthest away from the feathered position has to be changed in order to be aligned with the pitch angle being closest to the feathered position.

$k_{high} - k_{low}$ represents the highest possible difference in pitch rate which can be obtained between two wind turbine blades. Thus, $k_{high} - k_{low}$ represents how fast the pitch angle of the wind turbine blade having a pitch angle which is furthest away from the feathered position can be moved towards the pitch angle of the wind turbine blade having a pitch angle which is closest to the feathered position, if the wind turbine blade having the pitch angle which is furthest away from the feathered position is moved at the highest available pitch rate, and the wind turbine blade having the pitch angle which is closest to the feathered position is moved at the lowest available pitch rate.

Accordingly, $t_{PA}$ as defined above represents the largest difference between the pitch angles, i.e. how much the pitch angle which is furthest away from the feathered position must be moved before it is aligned with the pitch angle which is closest to the feathered position, divided by the largest possible difference in pitch rate, i.e. the largest possible rate at which the pitch angle which is furthest away from the feathered position can be moved towards the pitch angle which is closest to the feathered position. Thus, $t_{PA}$ represents the time required for aligning the two most extreme pitch angles if these pitch angles are changed at the highest and the lowest available pitch rate, respectively. Accordingly, it will not be possible to align the pitch angles faster than within the time $t_{PA}$.

As an alternative, the step of obtaining a measure for a misalignment of the pitch angles of the wind turbine blades may further comprise determining a first pitch angle, $\theta_1$, being the pitch angle which is furthest away from the feathered position, and a third pitch angle, $\theta_3$, being the pitch angle which is closest to the feathered position, and the step of calculating a time and/or an azimuth angle span may comprise calculating an azimuth angle span, $\Psi_{P4}$, required for aligning the pitch angles of the wind turbine blades as:

$$\Psi_{P4}=((\theta_3-\theta_1)/(k_{high}-k_{low}))\cdot\omega_R,$$

where $k_{high}$ is a highest available pitch rate, $k_{low}$ is a lowest available pitch rate, and $\omega_R$ is a rotor speed.

This embodiment is very similar to the embodiment described above, and the remarks set forth above are therefore equally applicable here. However, in this case an azimuth angle span, rather than a time, required for aligning the pitch angles of the wind turbine blades is calculated. $\Psi_{P4}$ is simply the time, $t_{P4}$, calculated above, multiplied by the rotor speed, $\omega_R$. Accordingly, assuming that the rotor speed remains constant, the rotor will be moved by the azimuth angle span, $\Psi_{P4}$, during the time, $t_{P4}$.

As an alternative to obtaining and comparing the pitch angles of the wind turbine blades, the step of obtaining a measure for a misalignment of the pitch angles of the wind turbine blades may comprise measuring one or more loads acting on the wind turbine, e.g. asymmetric rotor loads. According to this embodiment, it may, e.g., be determined that the pitch angles are aligned if an asymmetric rotor load is below a predefined, low, threshold value, and a high asymmetric rotor load may indicate a large misalignment of the pitch angles.

The step of calculating a time and/or an azimuth angle span required for aligning the pitch angles of the wind turbine blades may comprise estimating an alignment trajectory, based on a current rotor speed of the wind turbine rotor, based on a time derivative of a current rotor speed of the wind turbine rotor, and/or based on the obtained measure for a misalignment of the pitch angles of the wind turbine blades.

In the present context the term 'alignment trajectory' should be interpreted to mean a plan for how to align the pitch angles of the wind turbine blades, e.g. with respect to minimising loads on various wind turbine parts during the alignment process, with respect to minimising the duration of the alignment process, etc.

Thus, according to this embodiment, the current rotor speed, the time derivative and/or the measure for a misalignment of the pitch angles of the wind turbine blades is/are initially determined. Then an alignment trajectory, i.e. a plan for the alignment of the pitch angles of the wind turbine blades, is estimated, with due consideration to determined parameter(s).

For instance, if it is determined that the current rotor speed is high and that the misalignment of the pitch angles of the wind turbine blades is large, then it must be expected that the wind turbine blades will quickly be moved to a rotor position where large asymmetric loads act on the wind turbine blades and/or on the rotor, if alignment of the pitch angles of the wind turbine blades is not obtained. Therefore, in this case an alignment trajectory resulting in fast alignment of the pitch angles of the wind turbine blades may advantageously be selected.

As another example, if it is determined that the current rotor speed is high and that the misalignment of the pitch angles is small, then it must also be expected that the wind turbine blades will quickly be moved to a position where the misalignment of the pitch angles of the wind turbine blades result in asymmetric loads on the wind turbine blades and/or on the rotor, if alignment of the pitch angles is not obtained. However, since the misalignment is smaller than in the example above, the asymmetric loads will be lower in this case. Therefore, in this case, it is also desirable to align the pitch angles, but it is not as urgent as in the example above.

Therefore, in this case an alignment trajectory resulting in alignment at a medium speed may advantageously be selected.

As yet another example, if it is determined that the current rotor speed is low, then the degree of the misalignment of the pitch angles of the wind turbine blades is of minor significance, since it must be expected that the wind turbine blades will only slowly be moved to a position where the misalignment results in asymmetric loads on the wind turbine blades and/or on the rotor. Therefore, in this case an alignment trajectory resulting in a slow alignment of the pitch angles of the wind turbine blades may advantageously be selected, regardless of whether the misalignment of the pitch angles of the wind turbine blades is large or small.

One or more predefined criteria to be fulfilled by the wind turbine may include the pitch angles having reached a position where loads on a tower of the wind turbine have been reduced to a level below a predefined threshold value. According to this embodiment, the first shutdown strategy is applied until the loads on the tower have been reduced to an acceptable level. Then a switch to the second shutdown strategy is performed, and the pitch angles of the wind turbine blades are then aligned. The first shutdown strategy may, in this case, advantageously be a shutdown strategy which ensures that the loads on the wind turbine tower are minimised.

The step of estimating a point in time and/or an azimuth angle position where the pitch angles of the wind turbine blades should be aligned may comprise defining an azimuth angle of the rotor of the wind turbine where the pitch angles should be aligned, and calculating when this azimuth angle is reached, based on a current rotor speed of the wind turbine rotor and/or based on a time derivative of a current rotor speed of the wind turbine rotor. For instance, it may be desirable that the pitch angles of the wind turbine blades are alignment before the rotor has rotated ¼ turn, i.e. 90 degrees. The point in time, $t_{align}$, relative to the time where the shutdown command was received, where the pitch angles should be aligned could, e.g., be calculated as:

$$t_{align}=(\Psi_{final}-\Psi_0)/\omega_R,$$

where $\Psi_{final}$ is the azimuth angle where the pitch angles should be aligned, $\Psi_0$ is the azimuth angle of the rotor when the shutdown command is received, and $\omega_R$ is the current rotor speed.

Alternatively or additionally, the azimuth angle position, $\Psi_{align}$, where the pitch angles should be aligned could, e.g., be calculated as:

$$\Psi_{align}=\Psi_{final}-\Psi_0.$$

The method may further comprise the steps of calculating a time and/or an azimuth angle span required for aligning the pitch angles of the wind turbine blades and estimating a point in time and/or an azimuth angle position where the pitch angles of the wind turbine blades should be aligned, during the steps of moving the wind turbine blades towards a feathered position. According to this embodiment, the time and/or the azimuth angle span required for aligning the pitch angles and the point in time and/or the azimuth angle position where the pitch angles should be aligned are continuously calculated during the shutdown process. Thereby, the point in time and/or the azimuth angle position where a switch from the first shutdown strategy to the second shutdown strategy should be performed in order to allow the pitch angles to be aligned 'just in time' may also be continuously re-calculated during the shutdown process. This allows the shutdown process to be continuously evaluated and adjusted to take changes in the operating conditions, e.g. changes in the rotor speed and/or changes in wind speed, into account.

According to a second aspect the invention provides a method for controlling a wind turbine during shutdown, said wind turbine comprising a rotor carrying at least three wind turbine blades adapted to be pitched individually, the method comprising the steps of:

receiving a shutdown command for stopping operation of the wind turbine, subsequent to receiving the shutdown command, moving the wind turbine blades towards a feathered position in accordance with a first shutdown strategy, said first shutdown strategy including moving the wind turbine blades at identical pitch rates, and subsequently moving the wind turbine blades towards a feathered position in accordance with a second shutdown strategy, said second shutdown strategy providing alignment of the pitch angles of the wind turbine blades, wherein the step of moving the wind turbine blades towards a feathered position in accordance with a second shutdown strategy is performed after the step of moving the wind turbine blades towards a feathered position in accordance with a first shutdown strategy.

The method according to the second aspect of the invention is very similar to the method according to the first aspect of the invention, and the remarks set forth above with reference to the first aspect of the invention are therefore equally applicable here.

In the method according to the second aspect of the invention, upon receipt of a shutdown command, the wind turbine blades are initially moved towards the feathered position at identical pitch rates. As described above, such a shutdown strategy may result in loads, which are not related to asymmetry of the pitch angles, being reduced. However, since the wind turbine blades are moved towards the feathered position at identical pitch rates, any differences in the pitch angles due to the individual pitch strategy, will remain. Accordingly, the pitch angles of the wind turbine blades are not aligned during this part of the shutdown process.

Subsequently, the wind turbine blades are moved towards the feathered position in accordance with a second shutdown strategy, which ensures that the pitch angles of the wind turbine blades are aligned. The second shutdown strategy may, e.g., be as described above with reference to the first aspect of the invention.

The first shutdown strategy may comprise initially moving the wind turbine blades at an initial pitch rate, $k_1$, and subsequently moving the wind turbine blades at a final pitch rate, $k_2$, where $k_1 > k_2$. This has already been described above with reference to the first aspect of the invention.

The method may further comprise the steps of:
obtaining a measure for a misalignment of the pitch angles of the wind turbine blades, upon receipt of the shutdown command, and switching from the first shutdown strategy to the second shutdown strategy, based on said measure for a misalignment.

This may, e.g., be performed in the manner described above with reference to the first aspect of the invention. For instance, the switching may be performed in such a manner, that a long time and/or a large azimuth angle span is provided for the alignment process, in the case that a large misalignment is revealed. Similarly, a shorter time and/or a smaller azimuth angle span may be provided for the alignment process, in the case that a small misalignment is revealed.

According to a third aspect the invention provides a control unit for controlling pitch angles of a wind turbine, the wind turbine comprising a rotor carrying at least three wind turbine blades adapted to be pitched individually, the control unit being capable of performing the method of the first or second aspect of the invention.

According to a fourth aspect the invention provides a wind turbine comprising a rotor carrying at least three wind turbine blades adapted to be pitched individually, and a control unit according to the third aspect of the invention.

BRIEF DESCRIPTION OF THE DRAWINGS

The invention will now be described in further detail with reference to the accompanying drawings in which.

DETAILED DESCRIPTION OF THE DRAWINGS

Figure 1:
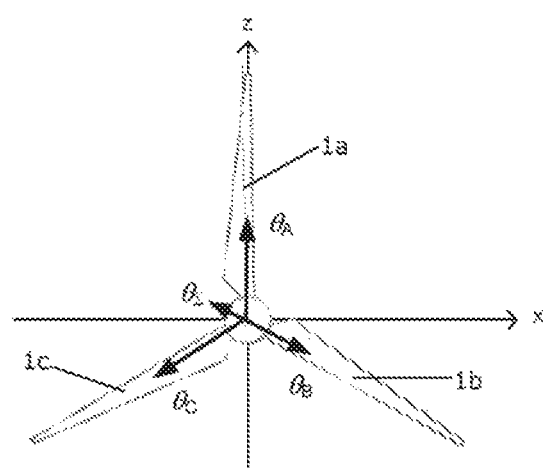
FIG. 1 illustrates pitch asymmetry of a wind turbine.

FIG. 1 shows three wind turbine blades 1a, 1b and 1c, arranged in a rotating coordinate system, in which the wind turbine blade 1a always coincides with the z axis. For each wind turbine blade 1a, 1b, 1c, the corresponding pitch angle is represented by a vector, $\theta_A$, $\theta_B$, and $\theta_C$. The vectors point in the same direction as the corresponding wind turbine blade 1a, 1b, 1c, and the magnitudes of the vectors equal the pitch angles, i.e. $|\theta_x| = \theta_x$. An aggregate pitch vector, $\theta_\Sigma = \theta_A + \theta_B + \theta_C$, is shown.

It can be shown that the squared magnitude of the aggregate vector is given by:

$$|\theta_\Sigma|^2 = \theta_A^2 + \theta_B^2 + \theta_C^2 - \theta_A\theta_B - \theta_A\theta_C - \theta_B\theta_C.$$

The aggregate vector represents a pitch asymmetry in the sense that its magnitude is equal to zero if all pitch angles are equal, and its magnitude is large if there is a high pitch asymmetry among the wind turbine blades. Accordingly, the magnitude of the aggregate vector is a suitable measure for a misalignment of the pitch angles of the wind turbine blades.

Thus, when performing a method according to an embodiment of the invention, the magnitude of the aggregate vector can be used for determining or planning a shutdown process for the wind turbine, when a shutdown command is received. As described above, when the misalignment of the pitch angles of the wind turbine blades is large, i.e. when the magnitude of the aggregate vector is large, it is necessary to assign a relatively long time for the alignment process. On the other hand, when the misalignment of the pitch angles of the wind turbine blades is small, i.e. when the magnitude of the aggregate vector is small, a shorter time can be assigned for the alignment process, thereby leaving more time for ensuring that other loads on the wind turbine blades, e.g. loads on the wind turbine tower, are reduced.

Figure 2:
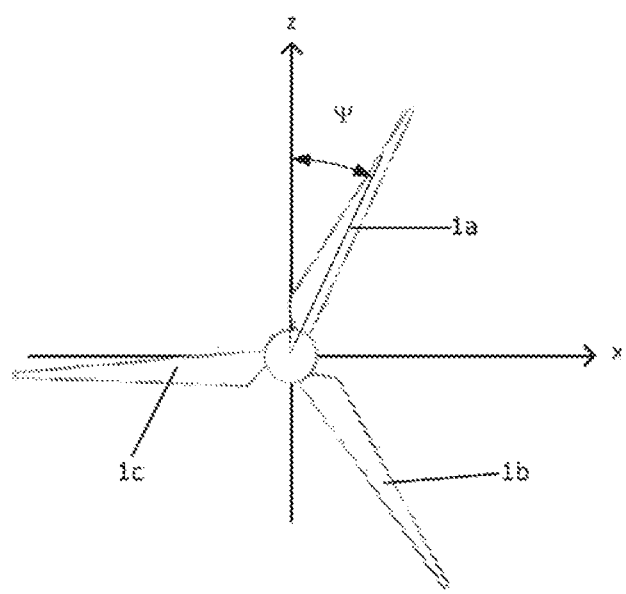
FIG. 2 illustrates azimuth angle of the rotor of a wind turbine.

FIG. 2 also shows three wind turbine blades 1a, 1b and 1c. However, in FIG. 2 the coordinate system is fixed in such a manner that the z axis represents the position of the wind turbine blade 1a at the time where a shutdown command is received. After a shutdown command is received the wind turbine blades 1a, 1b, 1c rotate with respect to the coordinate system. The angular position of the wind turbine blades 1a, 1b, 1c is in the following referred to as the azimuth angle. After a shutdown command has been received, the azimuth angle may, e.g., be indicated relative to the azimuth angle at the time of receipt of the shutdown command, in which case the azimuth angle is the angle which the angle which the wind turbine blades 1a, 1b, 1c have rotated since the shutdown command was received. The azimuth angle, relative to the angular position of the wind turbine blades 1a, 1b, 1c at the time of receipt of the shutdown command, is illustrated in FIG. 2 as $\Psi$.

It may be desirable that the pitch angles of the wind turbine blades 1a, 1b, 1c are aligned before the wind turbine blades 1a, 1b, 1c have reached a specific azimuth angle, $\Psi_f$, for instance before the wind turbine blades 1a, 1b, 1c have been allowed to rotate ¼ of a full turn. In this case $\Psi_f = \Psi_0 + \pi/2$, where $\Psi_0$ is the azimuth position at the time where the shutdown command is received. Since the pitch angles of the wind turbine blades 1a, 1b, 1c are selected, during normal operation, in such a manner that asymmetric loads on the rotor are minimised, the pitch angles are selected, inter alia, in accordance with the azimuth position of each wind turbine blade 1a, 1b, 1c. Accordingly, when a shutdown command is received, and the pitch angles of the wind turbine blades, 1a, 1b, 1c are no longer adjusted individually, but the azimuth positions of the wind turbine blades 1a, 1b, 1c continue to change, the wind turbine blades 1a, 1b, 1c are moved away from the azimuth positions which correspond to their individually adjusted pitch angles. This has the consequence that the asymmetric loads on the rotor increases as the azimuth angle, $\Psi$, increases. Therefore it is desirable to align the pitch angles of the wind turbine blades 1a, 1b, 1c before the azimuth angle, $\Psi$, reaches a certain maximum angle.

Figure 3:
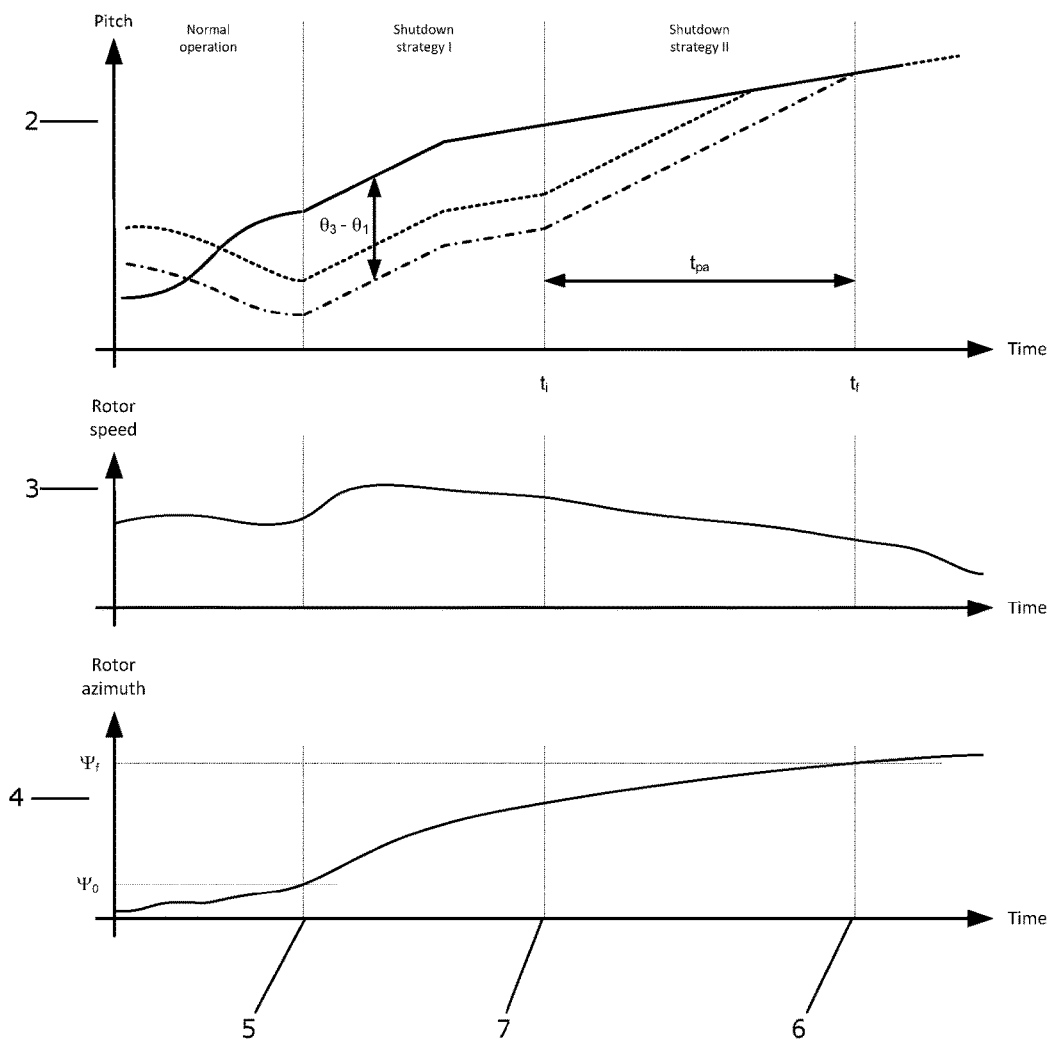
FIG. 3 illustrates pitch angles, rotor speed and rotor azimuth angle during shutdown of a wind turbine in accordance with an embodiment of the invention.

FIG. 3 shows three graphs illustrating a shutdown process of a wind turbine in accordance with a method according to an embodiment of the invention. The uppermost graph 2 illustrates pitch angles of three wind turbine blades, e.g. the wind turbine blades 1a, 1b, 1c illustrated in FIG. 2, as a function of time, during the shutdown process. The middle graph 3 illustrates rotor speed, $\omega_R$, as a function of time during the shutdown process, and the lowermost graph 4 illustrates azimuth angle, $\Psi$, as a function of time during the shutdown process.

At time 5 a shutdown command is received. It is clear from the uppermost graph 2 that the wind turbine has been operated in accordance with an individual pitch control strategy before the shutdown command was received, since the pitch angles of the three wind turbine blades differ from each other. Furthermore, it is clear from the lowermost graph 4 that the azimuth angle at the time 5 of receipt of the shutdown command is denoted $\Psi_0$.

Upon receipt of the shutdown command, a final azimuth angle, $\Psi_f$, where the pitch angles of the wind turbine blades must be aligned, is calculated, e.g. as $\Psi_f = \Psi_0 + \pi/2$, as described above. $\Psi_f$ is indicated in the lowermost graph 4.

Furthermore, upon receipt of the shutdown command, a measure for the misalignment of the pitch angles of the wind turbine blades is calculated. The measure for the misalignment may, e.g., be the difference between the largest pitch angle, $\theta_3$, i.e. the pitch angle of the wind turbine blade which is closest to the feathered position, and the smallest pitch angle, $\theta_1$, i.e. the pitch angle which is furthest away from the feathered position. In this case the measure for the misalignment of the pitch angles of the wind turbine blades is $\theta_3 - \theta_1$.

Based on the calculated final azimuth angle, $\Psi_f$, and on the rotor speed, $\omega$, at the time 5 of receipt of the shutdown command, an expected time, $t_f$, for reaching the final azimuth angle, $\Psi_f$, is calculated. In FIG. 3 this is indicated as time 6.

Furthermore, a time, $t_{PA}$, required for aligning the pitch angles of the wind turbine blades is calculated on the basis of the measure for the misalignment of the pitch angles of the wind turbine blades. If the misalignment of the pitch angles of the wind turbine blades is large it must be expected that a longer time is required for aligning the pitch angles than is the case if the misalignment of the pitch angles is small.

Finally, a time, $t_i$, for initiating pitch alignment is calculated as $t_f - t_{PA}$. This point in time is indicated as time 7 in FIG. 3. Thus, if pitch alignment is initiated at time 7, i.e. at $t_i$, it is ensured that exactly sufficient time is allowed for aligning the pitch angles of the wind turbine blades before time 6, i.e. before $t_f$, and thereby before the final azimuth angle, $\Psi_f$, is reached.

Furthermore, at time 5 a first shutdown strategy is initiated in order to move the pitch angles of the wind turbine blades towards a feathered position, thereby causing the wind turbine to shut down. Thus, the pitch angles of the wind turbine blades may be controlled according to the first shutdown strategy while the calculations described above are performed. Alternatively, the first shutdown strategy may be initiated immediately when the calculations described above have been completed.

The first shutdown strategy is designed to ensure that loads acting on the wind turbine tower are minimised. To this end all three wind turbine blades are initially moved towards the feathered position at a high speed, i.e. at a high pitch rate. After a predetermined time has elapsed, the pitch rate of each of the wind turbine blades is changed to a low speed. Accordingly, when the pitch angles of the wind turbine blades are controlled according to the first shutdown strategy, the pitch rates of all three wind turbine blades are identical at any given time. As a consequence, the pitch angles are not aligned, i.e. $\theta_3 - \theta_1$ remains constant as long as the first shutdown strategy is applied.

When the time $t_i$ is reached, a switch in shutdown strategy is performed from the first shutdown strategy to a second shutdown strategy. The second shutdown strategy is designed to provide alignment of the pitch angles of the wind turbine blades, while continuing to move the wind turbine blades towards the feathered position. To this end the wind turbine blade having a pitch angle which is closest to the feathered position is moved towards the feathered position at the low speed or pitch rate. The other two wind turbine blades are moved towards the feathered position at the high speed or pitch rate. This allows the two wind turbine blades having pitch angles which are furthest away from the feathered position to 'catch up' with the wind turbine blade having a pitch angle which is closest to the feathered position, thereby providing alignment of the pitch angles of the wind turbine blades.

As an alternative, the second control strategy could include that the wind turbine blade having a pitch angle which is furthest away from the feathered position is moved towards the feathered position at the high speed or pitch rate, while the other two wind turbine blades are moved towards the feathered position at the low speed or pitch rate. This allows the wind turbine blade which is furthest away from the feathered position to 'catch up' with the other two wind turbine blades.

When a wind turbine blade being moved at the high speed or pitch rate 'catches up' with a wind turbine blade being moved at the low speed or pitch rate, the pitch rate of the fast wind turbine blade is reduced to the low speed or pitch rate, and the aligned wind turbine blades are moved together towards the feathered position.

It can be seen from the uppermost graph 2 of FIG. 3 that the pitch angles of all three wind turbine blades are aligned exactly when $t_f$ is reached at time 6.

According to one embodiment, at least some of the calculations described above regarding $t_f$, $t_{P4}$ and/or $t_i$ may be continuously performed while the first shutdown strategy is performed. Thereby the time 7 for switching to the second shutdown strategy is continuously evaluated and re-estimated in order to take changes in various condition into account, and it is thereby ensured that the pitch angles of the wind turbine blades are aligned 'just in time', even if operating conditions, e.g. the rotor speed, w, and/or the wind speed, are changed during the shutdown process.

It should be noted that the process described above with reference to FIG. 2 could, alternatively, be performed without calculating time spans of points in time, but instead calculating azimuth angle spans and azimuth angle positions. However, the considerations above would be essentially the same.

Figure 4:
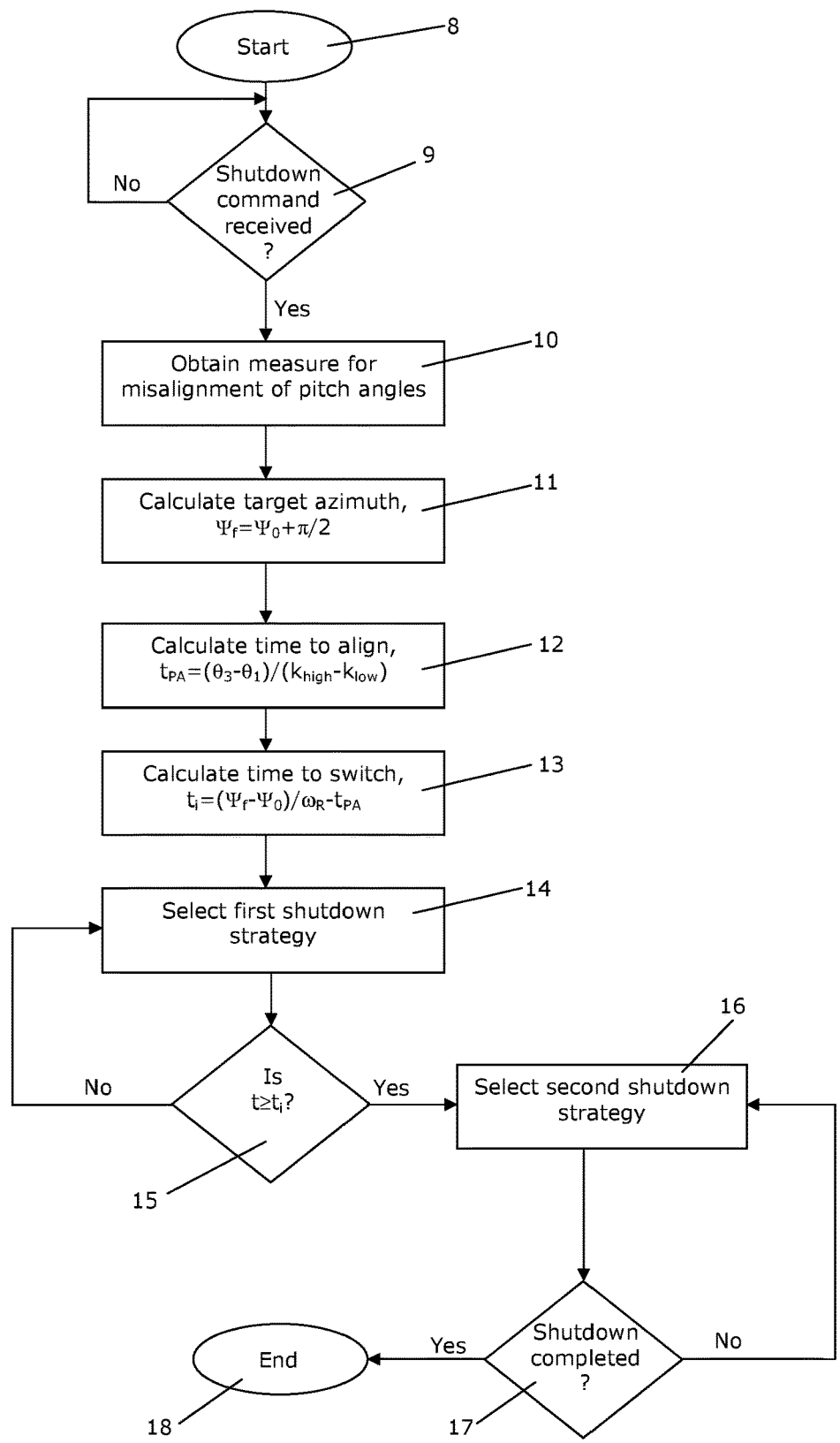
FIG. 4 is a flow diagram illustrating a method according to an embodiment of the invention.

FIG. 4 is a flow diagram illustrating a method according to an embodiment of the invention. The process is started at step 8. At step 9 it is investigated whether or not a shutdown command has been received. If this is not the case, normal operation of the wind turbine is continued, and the process is returned to step 9 for continued monitoring for a shutdown command.

In the case that step 9 reveals that a shutdown command has been received, the process is forwarded to step 10, where a measure for a misalignment of the pitch angles of the wind turbine blades is obtained. As described above, the measure for the misalignment may, e.g., be the difference between the pitch angle which is closest to the feathered position and the pitch angle which is furthest away from the feathered position. Alternatively, the measure for the misalignment may be the magnitude of an aggregate vector, as described above with reference to FIG. 1. Or the measure for the misalignment may be any other suitable measure which reflects how aligned or misaligned the pitch angles of the wind turbine blades are.

At step 11 a target azimuth angle, $\Psi_f$, is calculated. The target azimuth angle, $\Psi_f$, is the azimuth angle where the pitch angles of the wind turbine blades must, at the latest, be aligned in order to avoid excessive asymmetric loads on the wind turbine blades and/or on the rotor. In the embodiment illustrated in FIG. 4, it is assumed that the pitch angles of the wind turbine blades must be aligned before the rotor has rotated ¼ of a full turn, and the target azimuth angle, $\Psi_f$, is therefore calculated as $\Psi_f = \Psi_0 + \pi/2$, where $\Psi_0$ is the azimuth position of the rotor at the time where the shutdown command was received.

At step 12 a time, $t_{P4}$, required for aligning the pitch angles of the wind turbine blades is calculated. This calculation is performed on the basis of the previously obtained measure for the misalignment of the pitch angles of the wind turbine blades, since a large misalignment will typically require more time for aligning the pitch angles than a small misalignment. In the embodiment illustrated in FIG. 4, the alignment time is calculated as $t_{P4} = (\theta_3 - \theta_1)/(k_{high} - k_{low})$, where $\theta_1$ is the pitch angle of the wind turbine blade which is furthest away from the feathered position, $\theta_3$ is the pitch angle of the wind turbine blade which is closest to the feathered position, $k_{high}$ is the highest available pitch rate and $k_{low}$ is the lowest available pitch rate. Thus, $t_{P4}$ calculated in this manner reflects the shortest possible time for aligning the two wind turbine blades which are furthest away from each other, if one of them is moved at the highest available pitch rate and the other is moved at the lowest available pitch rate.

At step 13 a time, $t_i$, to switch from a first shutdown strategy to a second shutdown strategy is calculated. The second shutdown strategy is designed in such a manner that it provides alignment of the pitch angles of the wind turbine blades, and $t_i$ should therefore be selected in such a manner that it is ensured that the pitch angles of the wind turbine blades are aligned before the target azimuth angle, $\Psi_f$, is reached. In the embodiment illustrated in FIG. 4 $t_i$ is calculated as $t_i = (\Psi_f - \Psi_0)/\omega_R - t_{P4}$, where $\omega_R$ is the rotor speed at the time where the shutdown command is received. Thus, the estimated time elapsing before the target azimuth angle, $\Psi_f$, is reached, at the current rotor speed, $\omega_R$, is calculated, and the time, $t_{P4}$, required for aligning the pitch angles of the wind turbine blades is subtracted from this time. Thereby it is ensured that exactly sufficient time for aligning the pitch angles is allocated, and the alignment is not commenced before it is absolutely necessary.

At step 14 a first shutdown strategy is selected, and the wind turbine blades are moved towards the feathered position in accordance with the first shutdown strategy. The first shutdown strategy may, e.g., be designed to ensure that loads on various parts of the wind turbine, such as loads on the wind turbine tower, are minimised. For instance, the first shutdown strategy may be the first shutdown strategy described above with reference to FIG. 3.

The first shutdown strategy is applied until the time, $t_i$, is reached. Accordingly, at step 15 it is investigated whether or not $t_i$ has been reached. If this is not the case, the process is returned to step 14, i.e. the first shutdown strategy is still applied.

If step 15 reveals that $t_i$ has been reached, the process is forwarded to step 16 where a switch from the first shutdown strategy to a second shutdown strategy is performed. As described above, the second shutdown strategy is designed to provide alignment of the pitch angles of the wind turbine blades. The second shutdown strategy may, e.g., be the second shutdown strategy described above with reference to FIG. 3.

At step 17 it is investigated whether or not the shutdown has been completed. If this is not the case, the process is returned to step 16, i.e. the shutdown is continued in accordance with the second shutdown strategy. If step 17 reveals that the shutdown has been completed, the process is ended at step 18.

Thus, the method illustrated in FIG. 4 ensures that the pitch angles of the wind turbine blades are aligned 'just in time'. Thereby it is ensured that excessive asymmetric loads on the wind turbine blades and/or on the rotor are avoided, while ensuring that loads acting on other parts of the wind turbine can be minimised.

Figure 5:
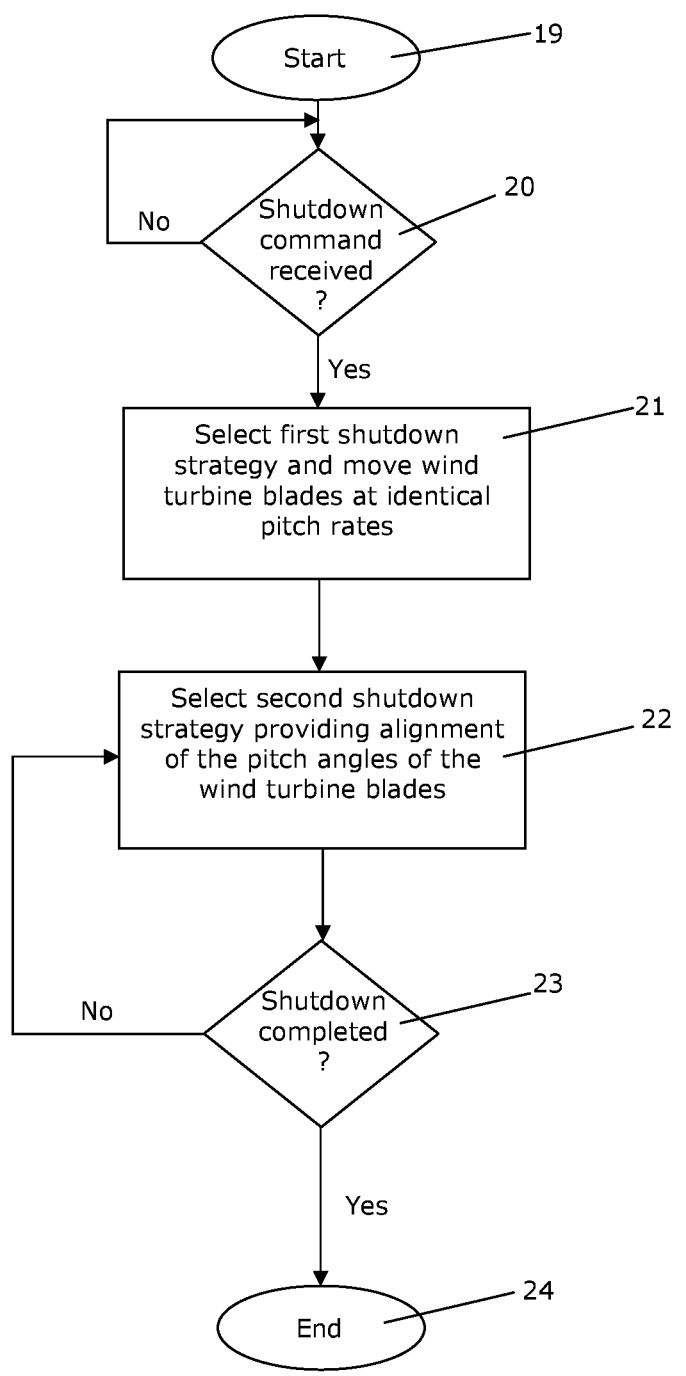
FIG. 5 is a flow diagram illustrating a method according to an alternative embodiment of the invention.

FIG. 5 is a flow diagram illustrating a method according to an alternative embodiment of the invention. The process is started at step 19. At step 20 it is investigated whether or not a shutdown command has been received. If this is not the case, normal operation of the wind turbine is continued, and the process is returned to step 20 for continued monitoring for a shutdown command.

In the case that step 20 reveals that a shutdown command has been received, the process is forwarded to step 21, where a first shutdown strategy is selected. The wind turbine blades are then moved towards a feathered position in such a manner that all of the wind turbine blades are moved at identical pitch rates. Accordingly, any misalignment of the pitch angles of the wind turbine blades, which was present at the time of receipt of the shutdown command, will remain during this part of the shutdown process. Thus, the possible misalignment of the pitch angles of the wind turbine blades is not reduced. Instead, the first shutdown strategy preferably ensures that other loads on the wind turbine, such as loads on the wind turbine tower, are reduced as fast as possible. The first shutdown strategy may, e.g., be the first shutdown strategy described above with reference to FIG. 3.

Next, the process is forwarded to step 21, where a second shutdown strategy is selected, i.e. a switch from the first shutdown strategy to the second shutdown strategy is performed. The second shutdown strategy is of a kind which provides alignment of the pitch angles of the wind turbine blades. Thus, during this part of the shutdown process, the misalignment of the pitch angles of the wind turbine blades is reduced, and thereby asymmetric loads on the wind turbine blades and/or on the rotor are reduced. The second shutdown strategy may, e.g., be one of the pitch aligning strategies described above, such as the second shutdown strategy described above with reference to FIG. 3.

At step 23 it is investigated whether or not the shutdown has been completed. If this is not the case, the process is returned to step 22, i.e. the shutdown is continued in accordance with the second shutdown strategy. If step 23 reveals that the shutdown has been completed, the process is ended at step 24.

Thus, in the method illustrated in FIG. 5, during shutdown of the wind turbine, the wind turbine blades are initially moved towards the feathered position at identical pitch rates, and subsequently the wind turbine blades are moved towards the feathered position in such a manner that the pitch angles of the wind turbine blades are aligned. Accordingly, the method balances the need for quickly reducing various loads, such as loads on the wind turbine tower, and the need for aligning the pitch angles of the wind turbine blades, thereby reducing asymmetric loads on the wind turbine blades and/or the rotor.

What is claimed is:

1. A method for controlling a wind turbine during shutdown, said wind turbine comprising a rotor carrying at least three wind turbine blades adapted to be pitched individually, the method comprising:
   receiving a shutdown command for stopping operation of the wind turbine,
   obtaining a measure for a misalignment of respective pitch angles of the at least three wind turbine blades,
   calculating a time required for aligning the respective pitch angles of the at least three wind turbine blades, based on said measure for a misalignment,
   estimating a point in time where the respective pitch angles of the at least three wind turbine blades should be aligned,
   moving the at least three wind turbine blades towards a feathered position in accordance with a first shutdown strategy until a time remaining until the estimated point in time corresponds to the calculated time required for aligning the respective pitch angles of the at least three wind turbine blades, or until one or more predefined criteria is/are fulfilled by the wind turbine, and
   subsequently moving the at least three wind turbine blades towards the feathered position in accordance with a second shutdown strategy, said second shutdown strategy providing alignment of the respective pitch angles of the at least three wind turbine blades
   wherein the second shutdown strategy comprises:
      comparing the respective pitch angles of the at least three wind turbine blades by comparing a pitch angle, $\theta_2$, of the second wind turbine blade with an average of a pitch angle, $\theta_1$, of the first wind turbine blade and a pitch angle, $\theta_3$, of the third wind turbine blade,
      individually selecting a pitch rate for each wind turbine blade, based on comparing the respective pitch angles, and
      moving each of the at least three wind turbine blades towards a feathered position at its selected pitch rate.

2. A method according to claim 1, wherein the first shutdown strategy comprises initially moving the at least three wind turbine blades at an initial pitch rate, $k_1$, and subsequently moving the at least three wind turbine blades at a final pitch rate, $k_2$, where $k_1 > k_2$.

3. A method according to claim 2, further comprising monitoring an acceleration of the rotor of the wind turbine during moving the at least three wind turbine blades towards a feathered position in accordance with the first shutdown strategy, and wherein a pitch rate of the at least three wind turbine blades is switched from the initial pitch rate, $k_1$, to the final pitch rate, $k_2$, based on the monitored acceleration of the rotor.

4. A method according to claim 3, wherein the pitch rate of the at least three wind turbine blades is switched from the initial pitch rate, $k_1$, to the final pitch rate, $k_2$, when the acceleration of the rotor is zero.

5. A method according to claim 1, wherein comparing the respective pitch angles of the at least three wind turbine blades comprises identifying a first wind turbine blade, a second wind turbine blade and a third wind turbine blade, wherein the first wind turbine blade has a pitch angle which is furthest away from the feathered position, the third wind turbine blade has a pitch angle which is closest to the feathered position, and the second wind turbine blade has an intermediate pitch angle between the pitch angle of the first wind turbine blade and the pitch angle of the second wind turbine blade.

6. A method according to claim 1, wherein individually selecting a pitch rate for each wind turbine blade comprises:
   selecting a high pitch rate, $k_{high}$, for the first wind turbine blade,
   selecting a low pitch rate, $k_{low}$, for the third wind turbine blade,
   selecting the low pitch rate, $k_{low}$, for the second wind turbine blade, when $\theta_2$ is larger than the average of $\theta_1$ and $\theta_3$, and
   selecting the high pitch rate, $k_{high}$, for the second wind turbine blade, when $\theta_2$ is smaller than or equal to the average of $\theta_1$ and $\theta_3$.

7. A method according to claim 1, wherein individually selecting the pitch rate for each wind turbine blade comprises, for each wind turbine blade, selecting the pitch rate among two or more predefined discrete pitch rate values.

8. A method according to claim 1, wherein individually selecting the pitch rate for each wind turbine blade comprises, for each wind turbine blade, selecting the pitch rate from a continuous range of pitch rates.

9. A method according to claim 1, wherein obtaining the measure for the misalignment of the respective pitch angles of the at least three wind turbine blades comprises determining the respective pitch angles of the at least three wind turbine blades and comparing the respective pitch angles to each other.

10. A method according to claim 9, wherein obtaining the measure for the misalignment of the respective pitch angles of the at least three wind turbine blades further comprises determining a first pitch angle, $\theta_1$, which is furthest away from the feathered position, and a third pitch angle, $\theta_3$, which is closest to the feathered position, and wherein calculating a time, $t_{PA}$, required for aligning the respective pitch angles of the at least three wind turbine blades is calculated as:

$t_{PA}=(\theta_3-\theta_1)/(k_{high}-h_{low})$, where $k_{high}$ is a highest available pitch rate and $k_{low}$ is a lowest available pitch rate.

11. A method according to claim 1, wherein obtaining the measure for the misalignment of the respective pitch angles of the at least three wind turbine blades comprises measuring one or more loads acting on the wind turbine.

12. A method according to claim 1, wherein calculating the time required for aligning the respective pitch angles of the at least three wind turbine blades comprises estimating an alignment trajectory, based on a current rotor speed of the rotor, based on a time derivative of a current rotor speed of the rotor, and/or based on the obtained measure for a misalignment of the respective pitch angles of the at least three wind turbine blades.

13. A method according to claim 1, wherein the one or more predefined criteria to be fulfilled by the wind turbine include the respective pitch angles having reached a position where loads on a tower of the wind turbine have been reduced to a level below a predefined threshold value.

14. A method according to claim 1, wherein calculating the time required for aligning the respective pitch angles of the at least three wind turbine blades and estimating the point in time where the respective pitch angles of the at least three wind turbine blades should be aligned, are performed when moving the at least three wind turbine blades towards the feathered position.

15. A method for controlling a wind turbine during shutdown, said wind turbine comprising a rotor carrying at least three wind turbine blades adapted to be pitched individually, the method comprising:
receiving a shutdown command for stopping operation of the wind turbine,
obtaining a measure for a misalignment of respective pitch angles of the at least three wind turbine blades,
calculating a time required for aligning the respective pitch angles of the at least three wind turbine blades, based on said measure for a misalignment,
estimating a point in time where the respective pitch angles of the at least three wind turbine blades should be aligned,
moving the at least three wind turbine blades towards a feathered position in accordance with a first shutdown strategy until a time remaining until the estimated point in time corresponds to the calculated time required for aligning the respective pitch angles of the at least three wind turbine blades, or until one or more predefined criteria is/are fulfilled by the wind turbine, and
subsequently moving the at least three wind turbine blades towards the feathered position in accordance with a second shutdown strategy, said second shutdown strategy providing alignment of the respective pitch angles of the at least three wind turbine blades
wherein the second shutdown strategy comprises:
comparing the respective pitch angles of the at least three wind turbine blades,
individually selecting a pitch rate for each wind turbine blade, based on the comparing of the respective pitch angles and by selecting the respective pitch rates which cause the at least three wind turbine blades to reach an aligned position substantially simultaneously, and
moving each of the at least three wind turbine blades towards a feathered position at its selected pitch rate.

16. A method for controlling a wind turbine during shutdown, said wind turbine comprising a rotor carrying at least three wind turbine blades adapted to be pitched individually, the method comprising:
receiving a shutdown command for stopping operation of the wind turbine,
obtaining a measure for a misalignment of respective pitch angles of the at least three wind turbine blades,
calculating a time required for aligning the respective pitch angles of the at least three wind turbine blades, based on said measure for a misalignment,
estimating a point in time where the respective pitch angles of the at least three wind turbine blades should be aligned by defining an azimuth angle of the rotor of the wind turbine where the respective pitch angles should be aligned, and calculating when this azimuth angle is reached, based on at least one of a current rotor speed of the rotor and a time derivative of the current rotor speed of the rotor,
moving the at least three wind turbine blades towards a feathered position in accordance with a first shutdown strategy until a time remaining until the estimated point in time corresponds to the calculated time required for aligning the respective pitch angles of the at least three wind turbine blades, or until one or more predefined criteria is/are fulfilled by the wind turbine, and
subsequently moving the at least three wind turbine blades towards the feathered position in accordance with a second shutdown strategy, said second shutdown strategy providing alignment of the respective pitch angles of the at least three wind turbine blades.

* * * * *